(12) United States Patent
Cheng (10) Patent No.: US 6,836,850 B2
(45) Date of Patent: Dec. 28, 2004

(54) PORTABLE SYSTEM ARRANGEMENTS HAVING DUAL HIGH-LEVEL-/LOW-LEVEL PROCESSOR MODES

(75) Inventor: Win S. Cheng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 09/725,839

(22) Filed: Nov. 30, 2000

(65) Prior Publication Data

US 2002/0066048 A1 May 30, 2002

(51) Int. Cl.$^7$ ................................................. G06F 1/32
(52) U.S. Cl. ..................................... 713/324; 713/320
(58) Field of Search .............................. 713/300, 320, 713/322, 323, 324

(56) References Cited

U.S. PATENT DOCUMENTS

| | | | | |
|---|---|---|---|---|
| 5,142,684 A | * | 8/1992 | Perry et al. ................. | 713/320 |
| 5,471,621 A | * | 11/1995 | Ohtsuki ....................... | 713/323 |
| 6,035,408 A | * | 3/2000 | Huang ......................... | 713/320 |
| 6,240,521 B1 | * | 5/2001 | Barber et al. ................ | 713/323 |
| 6,501,999 B1 | * | 12/2002 | Cai ............................. | 700/82 |

* cited by examiner

Primary Examiner—Dennis M. Butler
(74) Attorney, Agent, or Firm—Schwegman, Lundberg, Woessner & Kluth, P.A.

(57) ABSTRACT

Portable system arrangements having dual high-level-/low-level-processor modes implemented with a high-level processor and a low level processor. The two processors afford the combined advantages of both a portable computer and a personal organizer. The portable computer can be constructed such that the apparatus can be powered into a first mode of operation which provides functions/operations similar to the portable computer running high-level programs on the high-level processor, and the apparatus can be powered into a second mode of operation which provides functions/operations similar to the personal organizer running low-level programs on the low-level processor. The two processors can share memory and other peripherals.

21 Claims, 5 Drawing Sheets

PORTABLE SYSTEM ARRANGEMENTS HAVING DUAL HIGH-LEVEL-/LOW-LEVEL PROCESSOR MODES

FIELD

The present invention relates to portable system arrangements having dual high-level-/low-level-processor modes.

BACKGROUND

Both a background and example embodiments of the present invention will be described using a portable computer and electronic organizer as examples.

Figure 1:
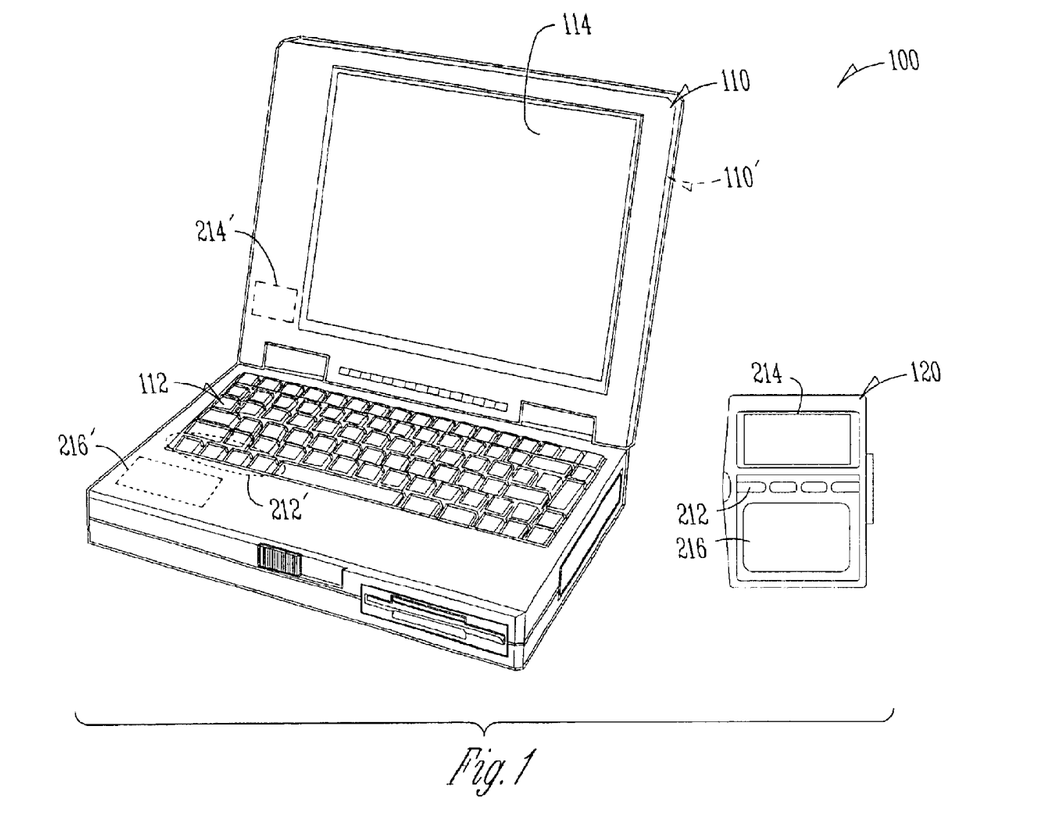
FIG. 1 is an example view of an example inventory of electronic components, including a portable computer and electronic organizer for background discussions, as well as a combined portable computer/electronic organizer as an example embodiment of the present invention.

As background, FIG. 1 illustrates a portable computer 110 having a keyboard 112 and a display screen 114 (e.g., liquid crystal display (LCD)). The portable computer 110 is constructed to contain a high-level-processor, and advantage thereof, is that it has high computing power allowing the portable computer 110 high-level-processing (e.g., graphics, spreadsheet, etc., calculations). For example, the portable computer 110 may have a Pentium-family processor manufactured by Intel Corporation of Santa Clara, Calif. Memory storage space within the portable computer 110 (e.g., via floppy, hard, compact disc—read only memory (CD-ROM), and digital versatile disc ROM (DVD-ROM)) is abundant, and accordingly, the portable computer 110 advantageously may have a large number of, and higher-level, application programs. That is, the portable computer 110 may have an advantageous large high-level software application library. A disadvantage of the portable computer, is that it correspondingly has a high rate of power consumption (owing mainly to the high-level-processor and also peripherals (e.g., hard disk, liquid crystal display (LCD) panel, etc.), and therefore battery operation thereof (without connection to an external power source) lasts for a relatively short period of time (e.g., 3–4 hours). Often times, an external power source (e.g., a house wall socket, an airline seat's power socket) is not available, limiting usage of the portable computer 110 only to the limited battery life.

Further shown for background within FIG. 1 is a personal organizer 120 having operational keys 212, display screen 214 (e.g., small-sized LCD), and an input pad 216 allowing user (not shown) input via a pencil, stylus, or via touch of a human finger (e.g., touch pad). The term "electronic organizer" should be interpreted broadly in the sense that this disclosure and claims associated herewith cover all types of electronic organizers, e.g., hand-held personal data assistants (PDA's), address books, etc. The electronic organizer is constructed to contain a low-level-processor having a low rate of power consumption, e.g., a Strong ARM-family processor manufactured again by Intel Corporation of Santa Clara, Calif. An advantage of the electronic organizer 120, is that battery operation thereof (without connection to an external power source) lasts a relatively longer period of time (e.g., 20 hours). Another advantage is that the personal organizer 120 is relatively small and is easily carried (e.g., in a user's pocket). However, as the low-level-processor only affords low-level-processing, then graphics, spreadsheet, etc., calculations are impossible, difficult or inefficient to handle with the low-level-processor. Further, since memory storage space within the personal organizer is limited (e.g., via limited FLASH memory resources), the personal organizer disadvantageously may have a limited number of, and lower-level, application programs.

Accordingly, a user may own/use/carry both such equipment, and the combination of the portable computer 110 and personal organizer 120 can be said to represent an electronic equipment inventory 100 of a user. A disadvantage of the inventory 100 is that often times a user must juggle attention between the devices in order to access needed information. For example, a user may first need to access the personal organizer 120 in order to determine a schedule and due date of documents which are needed to be prepared, and then the user may have to access the portable computer 110 for higher-level application software necessary to prepare the documents.

Further, at times, for example, during long overseas trips, a user may wish to limit a number of electronic equipment items which he/she would be carrying. Opting for only the organizer 120 is disadvantageous in that the user will not have access to the high-level-processing and large high-level software application library of the portable computer 110. Opting for only the portable computer 110 is disadvantageous in that an operation and long boot up time thereof is limited as discussed above (due to the high power consumption requirements of the portable computer 110). Further, the user may not have access to important scheduling information contained within the electronic organizer 120.

What is needed is a new arrangement affording the combined advantages of both the portable computer 110 and the organizer 120.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

Similarly.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Still further, well known power/ground connections to ICs and other components may not be shown within the FIGS. for simplicity of illustration and discussion, and so as not to obscure the invention. Arrangements may also be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits, flowcharts) are set forth in order to described example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Turning now to detailed description, in order to provide an improved apparatus affording the combined advantages of both the portable computer 110 and the organizer 120, the portable computer 110 can be constructed with special arrangements to result in a improved apparatus 110' (FIG. 1 portable computer 110 supplemented with the FIG. 1 dashed line components). More specifically, the improved apparatus 110' can be adapted with constructions such that the apparatus can be powered into a first mode of operation which provides functions/operations similar to the portable computer 110, and with additional constructions such that the apparatus can be powered into a second mode of operation which provides functions/operations similar to the electronic organizer 120. The improved apparatus 110' may hereinafter be called integrated apparatus 110', with the term "integrated" being used in the sense that the improved apparatus integrates at least two previously separate apparatus (i.e., the portable computer 110 and the organizer 120) together. The integrated apparatus is advantageous in terms of reducing a total cost of ownership in that only a single apparatus has to be purchased, as opposed to multiple.

In further particularizing, the integrated apparatus 110' may be adapted to provide a first apparatus (e.g., a portable computer) operated with the high-level-processor in a first mode of operation, i.e., contain and power all of the components and arrangements as the previous portable computer 110 such that the integrated apparatus 110' can be selectable into a first apparatus mode wherein the portable computer 110 operates in with high-level processing and high-level application software, albeit with high power consumption. The integrated apparatus 110' may also be adapted to provide a second apparatus (e.g., an electronic organizer) operated with the low-level-processor in a second mode of operation, i.e., have arrangements supportive of a second mode of operation wherein the integrated apparatus 110' operates with a low-level processor, low-level application software and low power consumption mode just like the electronic organizer 120. With regard to operation, powering up in differing apparatus modes may cause differing initializing routines to be completed, differing programming to be supplied to differing components, etc., to achieve the differing apparatus.

Further, the system may be arranged such that the low-level processor is powered to operate during the second apparatus mode time, exclusive of operation of the high-level processor. Still further, the improved apparatus may be constructed to allow one or more of: powering into the first apparatus mode during times exclusive of powering into the second apparatus mode, and powering into the second apparatus mode during times exclusive of powering into the first apparatus mode.

Discussion turns to first example adaptations which may be used to achieve the integrated apparatus 110'. More specifically, a portion (e.g., enclosed within the short-dashed oval) 212' of the keyboard 112 may be used to emulate and provide operation and function of the operation keys 212 of the organizer 120. Such is particularly advantageous when the portion 212' may be adapted to closely match a layout and function of the operation keys 212, such that a required adjustment/discomfort by a user in adapting from using the organizer 120 to the integrated apparatus 110' is minimal. As another option, specialized keys separate from the keyboard 112 may be provided on the integrated apparatus 110'. As an alternative to a limited number of keys, the arrangement may instead take full advantage of available keyboard resources, and be adapted to allow a user to enjoy the full, regular-sized keyboard 112 while operating in the second (e.g., organizer) apparatus mode. The integrated apparatus 110' may be constructed/configured to actually allow user selection (e.g., via selection of hardware switches, software programming) of the degree of use of available resources.

Further, with regard to display, a display 214' may be additionally provided in a size, construction and function similar to the display 214 of the organizer 120, so as to emulate the same (e.g., may be a size-matched small-sized LCD). Alternatively, a portion (not shown) of the original display 114 may provide emulation and operation of the organizer 120's display 214. However, in an interest in minimizing power consumption in using the original display 114, special arrangements may have to be made to provide power and backlighting to only a portion of the display 114. One viable option would be that if the display screen 114 is provided as a split screen, then half (e.g., a lower half) of the screen 114 could be powered and backlit so as to emulate and provide operation of the screen 214, while the opposing half of the screen 114 remained unpowered and unlit for power savings. Alternatively, often times portable computers contain a smaller monochrome LCD display separate from the larger display 114, e.g., for providing status information (e.g., battery level, hard disk access, optical disk access, etc.). If such is the case, the smaller LCD 214' may serve double-duty, providing status information while the integrated apparatus 110' is operating in the first apparatus mode, and providing operation of the organizer's display 214 when the integrated apparatus 110' is in the second apparatus mode. As an alternative to a limited-sized display, the arrangement may instead take full advantage of the available display resources, and be adapted to allow a user to enjoy the full, regular-sized display 114 while operating in the second (e.g., organizer) apparatus mode. Again, the integrated apparatus 110' may be constructed/configured to actually allow user selection (e.g., via selection of hardware switches, software programming) of the degree of use of available resources.

Turning next to the stylus or touch pad 216', such may be provided to achieve emulation and operation of the organizer's pad 216. Often times, portable computer arrangements will already have some type of touch input device (e.g., a touch pad), and such touch pad can serve the double duty in both modes.

Figure 2:
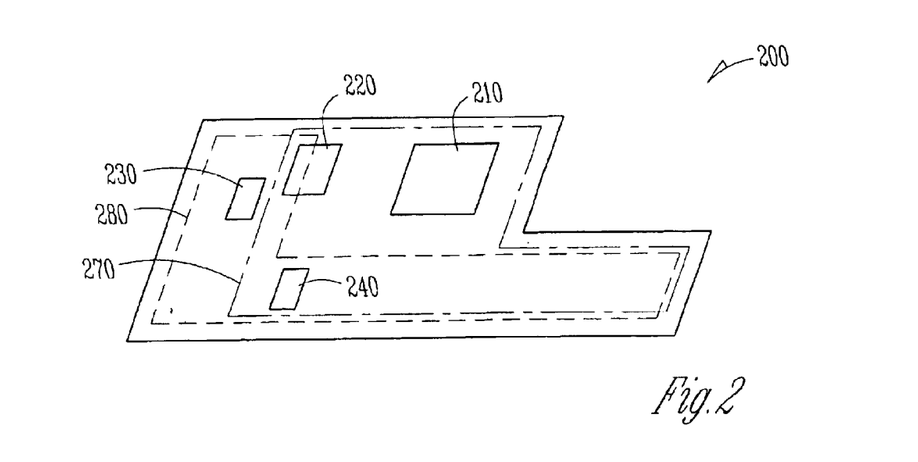
FIG. 2 is a schematic view of an example motherboard usable in the FIG. 1 portable computer, and having differing example power zones for powering different components at differing times.

Discussion continues with further example adaptations which may be used to achieve the integrated apparatus 110'. More particularly, FIG. 2 illustrates a schematic view of an example motherboard 200 which can be used within the integrated apparatus 110'. Such motherboard 200 is constructed/arranged, for example, so as to allow power to be supplied to differing ones of motherboard components in each of the aforementioned differing apparatus modes. More particularly, in order to illustrate such difference, FIG. 2 (as well as FIGS. 3–6 discussed ahead) illustrates the powering of differing ones of the components in representative form using a differing short-dash-enclosure 280 and long-/short-dash-enclosure 270.

Example components 210, 220, 230 and 240 are used to represent example motherboard components provided on the motherboard 200. More particularly, the motherboard component 210 may, for example, be a high-level processor such as a Pentium-family processor manufactured by Intel Corporation of Santa Clara, Calif. The component 220 may be, for example, a graphics and memory controller while the third component 240 may be an input/output (I/O) controller hub Finally, motherboard component 230 may represent a low-level processor such as the aforementioned Strong ARM-family processor or equvalent, or even an application specific IC (ASIC). With respect to the present disclosure and claims, the term "low-level-processor" should be interpreted broadly as encompassing scope beyond microprocessors. Of course, numerous other components and wiring traces are not illustrated within the FIG. 2 motherboard 200, as such items are well known in the art, and are thus omitted from this disclosure for sake of brevity.

Returning to discussion of the powering of differing components in differing modes, components 210, 220 and 240 may be arranged to receive power in the aforementioned first apparatus mode, as illustrated representatively by being shown as being contained within the long-/short-dashed enclosure 270. Note within FIG. 2 that within the first apparatus mode, the high-level-processor component 210 is powered, while the low-level-processor component 230 is not.

Selective powering can be accomplished through any of numerous arrangements, and as non-exhaustive examples, the improved apparatus 110' may have a plurality of wiring feeds which feed power to differing components, or various components may be wholly or substantially un-powered via power control circuitry. Further, with regard to power supply, a power supply module of the improved apparatus may also need modification, e.g., to support a lower or power down requirement of the second apparatus (i.e., low-level-processor) mode. For example, the low-level-processor may have lower or differing power requirements (e.g., voltage levels) than the high-level-processor.

As an alternative to the described FIG. 2 arrangement where the low-level-processor component 230 normally providing low-level processing during the second apparatus (e.g., organizer) mode is not used within the first apparatus mode, the low-level-processor component 230 may also be powered in the first apparatus mode in the event that such component 230 may serve double duty to provide valuable processing (e.g., assist in graphics processing or keyboard controller functions) during the first apparatus mode. In such a situation, provisions may be made to change a programming or operation of the low-level-processor component 230 between the differing apparatus modes. For example, a first portion of a FLASH memory (not shown) could be used to program the component 230 to operate in a first manner in the first apparatus mode, and a differing portion could be used to program the component 230 to operate in a differing manner in the second apparatus mode.

In continuing discussion with respect to the second mode, shown in FIG. 2 are components 220, 230 and 240 powered in the second apparatus (e.g., organizer) mode, as illustrated representatively by being contained within the short-dashed enclosure 280. The high-level-processor component 210 and most peripheral devices (e.g. HDD, CDROM) are not powered most time during the second apparatus mode, and thus substantial power savings is achieved within the second apparatus mode, i.e., the high-level processor which consumes large amounts of power, is not turned on, or at least not fully powered. While the low-level-processor was described above as possibly remaining powered and used during the first apparatus mode (e.g., to assist in graphics processing), in contrast, the high-level-processor remains substantially or wholly unpowered in the second apparatus mode, as such is desirable to achieve power savings.

An additional aspect of interesting note with respect to FIG. 2 is as follows. More particularly, the short-dashed enclosure line 280 drawn intersecting through the motherboard component 220 is meant to represent a situation where only portions of such motherboard IC component are powered up, whereas other portions of the IC component and system components (e.g., hard disk, CD-ROM) remain unpowered. An understanding of such should become more clear in the FIG. 5 discussions ahead.

Figure 3:
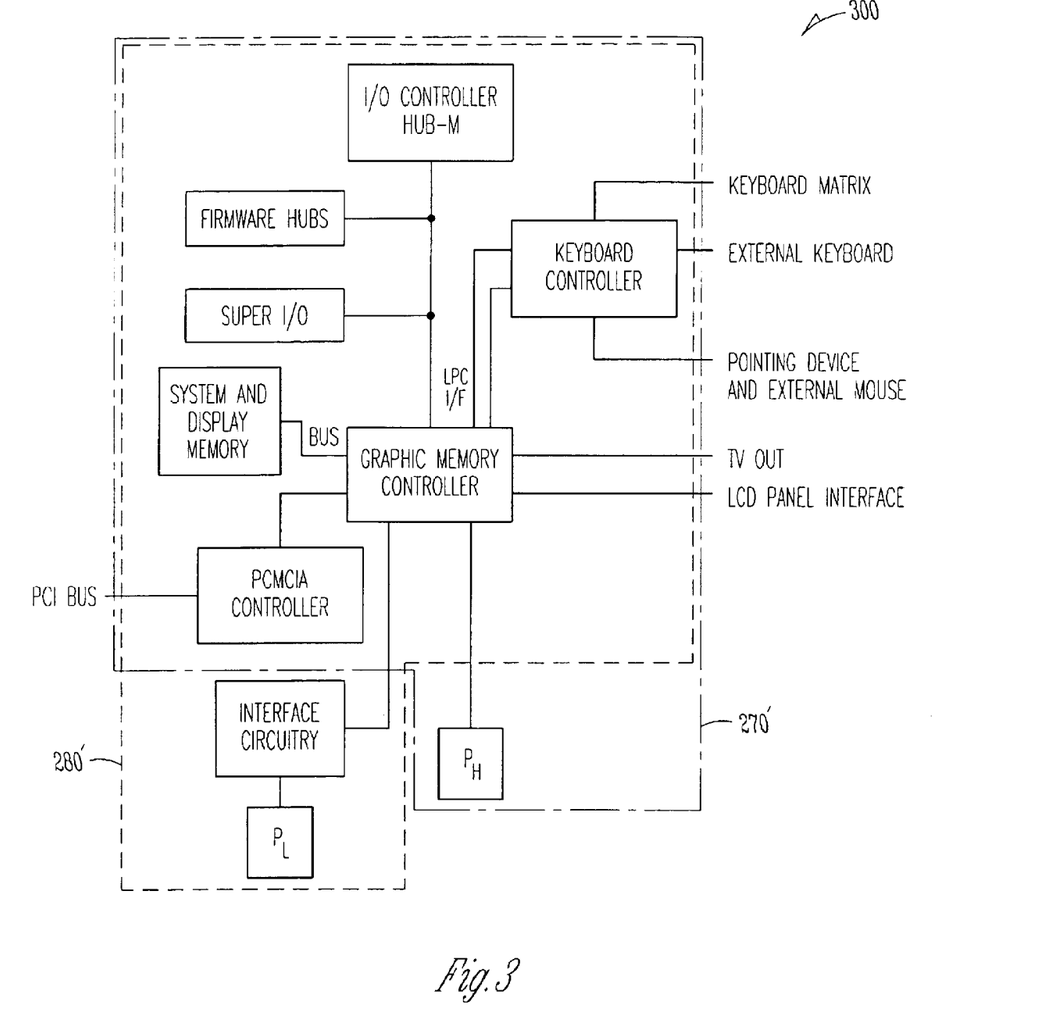
FIG. 3 is a block diagram of an example system implementable within the FIG. 1 portable computer, and illustrating differing example power zones, and having a discrete high-level processor and a discrete low-level processor.

Discussion turns next to FIG. 3 which illustrates a block diagram of an example arrangement 300 implementable on the FIG. 2 motherboard 200 within the integrated apparatus 110', for achieving an example embodiment of the present invention. More particularly, shown are a high-level-processor $P_H$ and a low-level-processor $P_L$, each connected to a Graphic Memory Controller. In the FIG. 3 arrangement, both the high-level-processor (e.g., the aforementioned Pentium-family processor) and the low-level-processor $P_L$ (e.g., the aforementioned StrongARM-family processor or an ASIC) are provided as discrete IC components on the FIG. 2 motherboard 200. Additional Interface Circuitry may be required between the low-level-processor $P_L$ and Graphic Memory Controller to facilitate proper interfacing there between.

Further connected to Graphics Memory Controller is a PCMCIA Controller connected to a PCI bus. The PCMCIA Controller arrangement is for the purpose of allowing PCMCIA cards to be inserted into and operated with the integrated apparatus 110'. Further shown extending from the Graphics Memory Controller are a memory bus (connected to system and display memory), an LCD panel interface, and a TV/CRT Output . Still further connected to the Graphics Memory Controller is a keyboard controller (KBC) having extended therefrom lines for a keyboard matrix, external keyboard and pointing device/external mouse. Finally, an I/O controller hub (ICH) is also shown connected to the Graphics Memory Controller, with firmware hubs and super I/O blocks also extending from the interconnection. A majority of these components are well known in the art and are not a subject of the present invention, so such are not further detailed or discussed for sake of brevity. Further, numerous other components, lines, etc., are not illustrated within FIG. 3 (as well as FIGS. 4–6), as such items are well known in the art, and are thus omitted from this disclosure for sake of brevity.

Turning discussion back again to the powering arrangement, as shown again within the long-/short-dash-enclosure 270', in a first apparatus mode of operation, all components are powered, except for the low-level processor $P_L$ as well as any $P_L$-supportive components (e.g., the Interface Circuitry) unnecessary for first apparatus operation. Conversely, the short-dashed enclosure 280' illustrates the second apparatus mode of operation wherein all components are powered, except for the high-level, high-processing capable processor $P_H$ (as well as any $P_H$-supportive components unnecessary for second apparatus operation).

Again, since the processor $P_H$ consumes significant power, a substantial power savings is achieved in the second apparatus mode, thus allowing the integrated apparatus 110' to operate for a substantially long period of time from the integrated apparatus 110's battery source. Thus, the lower-level apparatus (e.g., organizer) provided with the second apparatus mode is able to leverage the improved apparatus' larger sized battery into a significantly long operational time, i.e., can advantageously make use of the larger battery contained within the improved apparatus, to last longer than was possible simply with the organizer 120's battery.

Additional types of leveraging may also be achieved. More particularly, in contrast to the low-level-processor programming being limited by the prior organizer 120's limited available internal memory storage, programming for the low-level processor $P_L$ within the integrated apparatus 110' may be significantly greater due to the abundant memory storage arrangements within the integrated apparatus 110'. As examples, such programming could be provided within a FLASH memory connected to the low-level processor $P_L$, or could be provided via programming stored, for example, within dynamic random access memory (DRAM), on a hard disk of the integrated apparatus 110'. That is, the integrated apparatus 110' has significantly more memory resources than the original organizer 120, and such memory resources may be made available to the apparatus empowered within the second apparatus mode, to result in better and/or more diverse programming than was available within the original organizer 120. Since all the memory storage units (e.g., the floppy, hard, CD-ROM, DVD drives) may be adapted to be powered on in the second mode of operation, the low-level-processor may access information within all of such devices. Again, such is advantageous over the FIG. 1 electronic organizer 120 which has limited memory storage resources. As a power-savings option, the floppy, hard, CD-ROM, DVD drives may be normally maintained in a power down or suspend mode while operating the improved apparatus in the second apparatus mode, and unsuspended only momentarily at times to allow the second apparatus access thereto.

In addition, a further advantage is that since the second apparatus' files are stored on the same memory resources in common with the first apparatus, such apparatuses may have access to each other's files when in the first or second apparatus modes. Thus, instead of the previous juggling example where a user needed to access the personal organizer 120 in order to determine a schedule and due date of documents which are needed to be prepared, and then access the portable computer 110 for higher-level application software necessary to prepare the documents, a user may now simply operate only in the first (portable computer) apparatus mode and access all necessary files/programs for both such operations.

Figure 4:
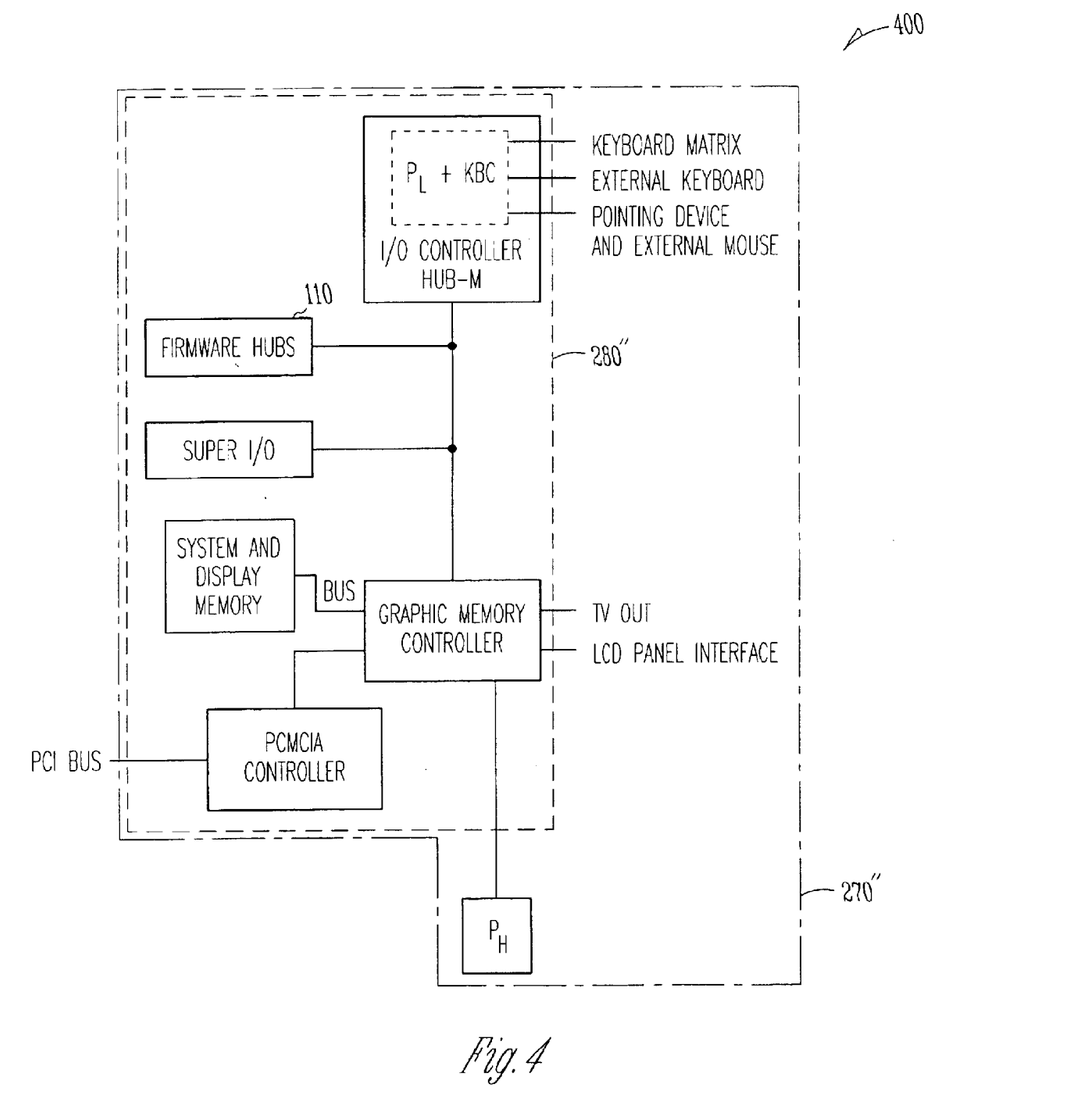
FIG. 4 is a block diagram of another example system also implementable in the FIG. 1 portable computer, and having a discrete high-level processor, and a low-level processor provided as part of a chipset together with another system component.

FIG. 4 illustrates a system 400 which is similar to that of the FIG. 3 system 300, and accordingly, only differences therefrom are discussed for sake of brevity. More particularly, instead of a discrete $P_L$ IC, the FIG. 4 arrangement provides the low-power-processor $P_L$ as part of the ICH, i.e., as part of a chipset. Such is advantageous in that the integration of the $P_L$ processor arrangement within the ICH lessens a number of components within the FIG. 4 arrangement, thus reducing inventory, assembly, costs, etc. Again, the FIG. 4 $P_L$ processor can operate based upon programming provided via a FLASH memory associated with the ICH, or via programming provided via the system hard disk, etc.

Although practice of the present invention is not limited thereto, in addition, the keyboard controller (KBC) can also be provided as part of the ICH chipset. More specifically, such KBC can be similar to a normal keyboard controller arrangement. The keyboard controller function can be included inside low-power-processor $P_L$.

The provision of the low-level processor and KBC as part of the ICH chipset is very advantageous in that the I/O controller hub is a popular/common component used within many differing types of systems. It is expected that the availability of the low-level processor $P_L$ and KBC as part of the ICH will prove useful in many types of systems even beyond embodiments of the present invention. For example, newer generation set-top boxes having internal hard disk drives and limited operational keys may find advantage use of an ICH/$P_L$/KBC chipset.

Figure 5:
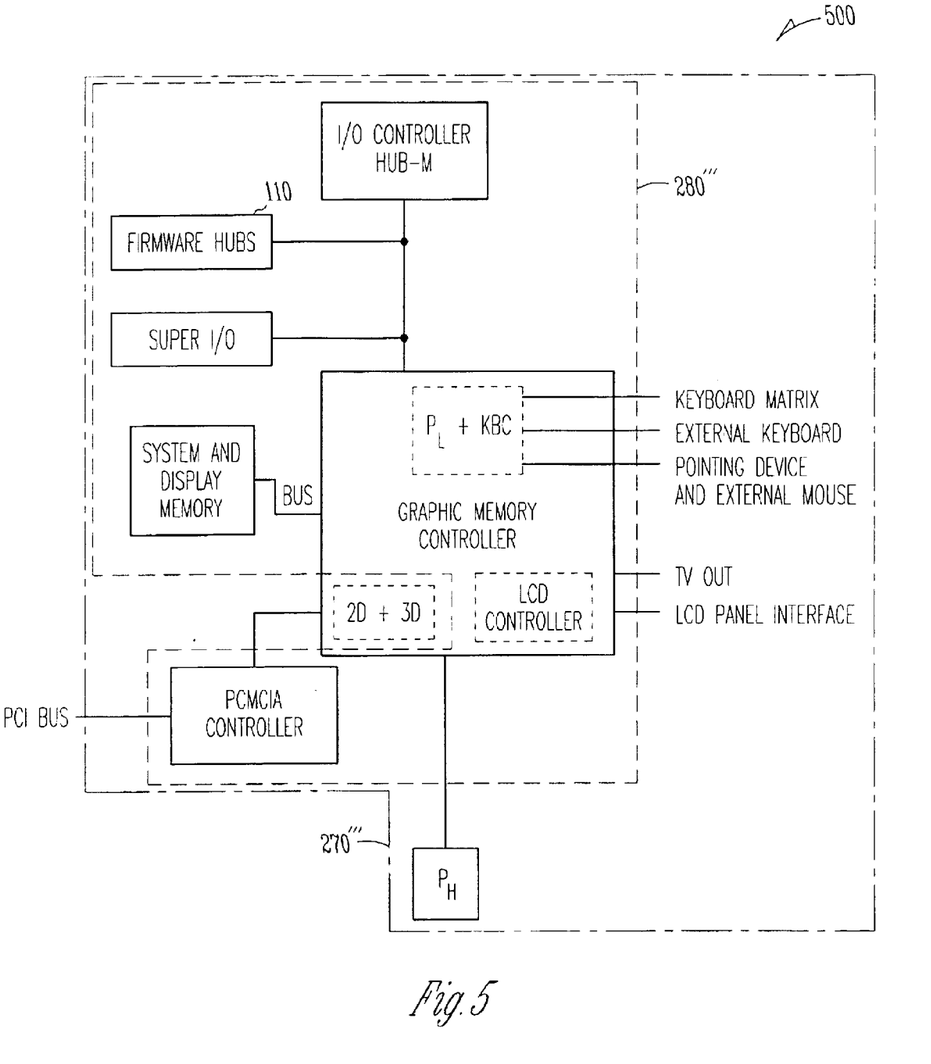
FIG. 5 is similar to FIG. 4, but shows the low-level processor provided as part of a differing chipset component.

FIG. 5 is similar to FIG. 4, but shows an example system 500 in which the low-level processor $P_L$ arrangement and KBC are provided as part of a differing chipset component. More particularly, rather than being provided as part of the ICH chipset, the the low-level processor $P_L$ arrangement and KBC are instead provided as part of a Graphics Memory Controller chipset. Such is advantageous, in that $P_L$ may serve double duty to provide valuable processing (e.g., assist in graphics processing) during the first apparatus mode. In such a situation, provisions may be made to change a programming or operation of $P_L$ to operate in a second apparatus manner in the second apparatus mode (short-dashed enclosure 280'''), and to operate in the differing graphics-processing-assist manner in the first apparatus mode(short-/long-dashed enclosure 270'''). Again, a Graphics Memory Controller chipset incorporating the low-level-processor $P_L$ and KBC is expected to be popular for the same reasons set forth above for the ICH chipset being popular.

Another aspect is of interest to note with respect to the FIG. 5 embodiment. More particularly, as mentioned briefly above, the short-dashed enclosure line 280''' drawn intersecting through the Graphics Memory Controller is meant to represent a situation where only portions of such component are powered up, whereas other portions of the component remain unpowered. For example, in the first (e.g., portable computer) apparatus mode, all components of the Graphics Memory Controller chipset may be powered, with the low-level-processor $P_L$ being programmed/operated to assist with graphic processing. In contrast, in the second (e.g., organizer) apparatus mode, two-dimensional (2D) and three-dimensional (3D) processing portions of the Graphics Memory Controller chipset may be unpowered (e.g., via appropriate programming, selection of disabling switches, input pins, etc), thus resulting in additional power savings (i.e., 2D and 3D engines may consume substantial power).

Since FIG. 5 is similar to FIG. 4, redundant descriptions and discussions of FIG. 5 beyond those supplied above are again omitted for sake of brevity.

Figure 6:
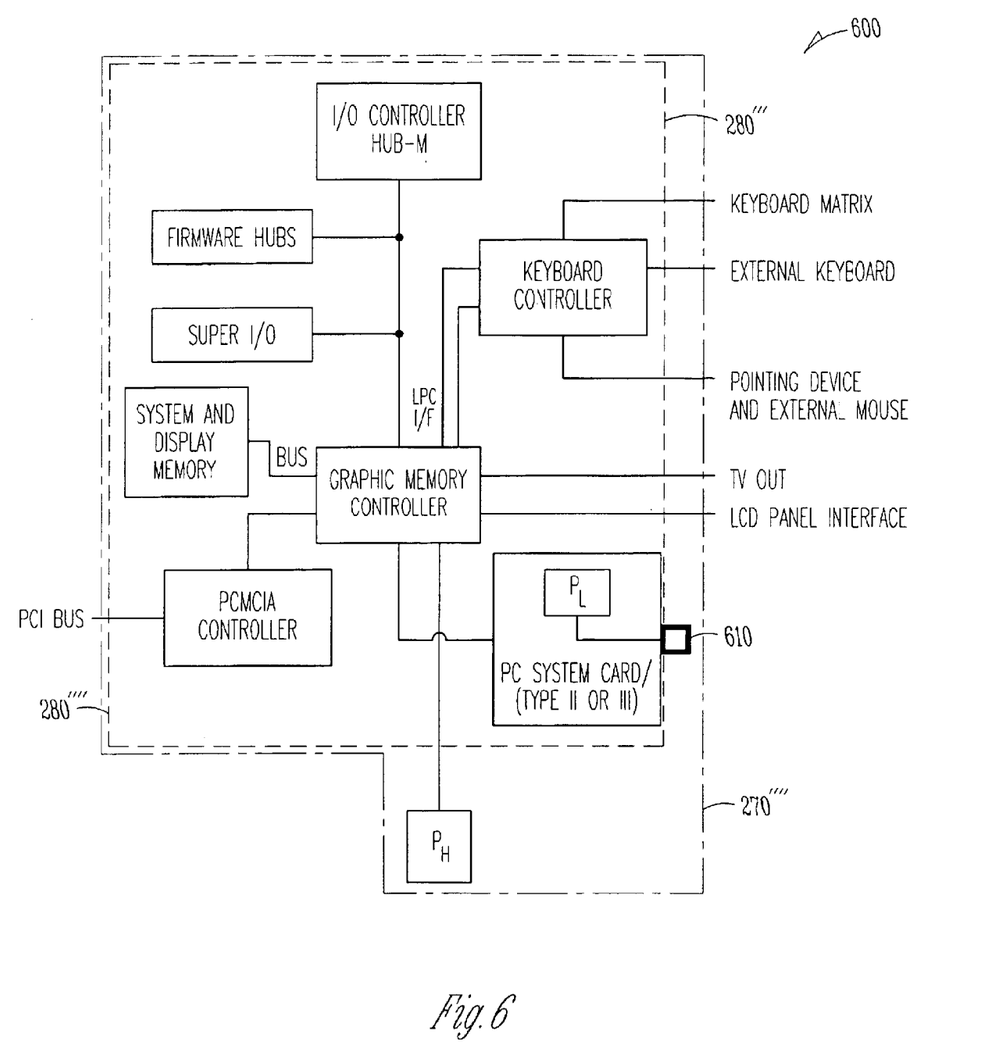
FIG. 6 is similar to FIG. 1, but shows the low-level processor provided as part of a removable integrated circuit (IC) card.

FIG. 6 is similar to FIG. 1, but shows the low-level processor $P_L$ (and supportive components) provided as part of a removable IC card. Further, key 610 (shown representatively by a single item) may be provided on the body of the IC card, with such key 610 being controlled by supportive circuitry within the IC card. One or more of keys 610 may represent a power-on switch for the second (IC card) apparatus. An advantage of such arrangement is that prior apparatus (e.g., portable computer 110) may be able to be retrofitted to also provide the second apparatus, provided that construction of the prior apparatus is such that it allows the IC card to effect selective powering of the low-level-processor $P_L$, without the powering of the high-level-processor $P_H$. Further, unless the construction of the prior apparatus is such that it allows the IC card to effect selective use of the display 114 during the second apparatus mode, a discrete display would also have to be provided, e.g., as part of the IC card. Alternatively, instead of representing a retrofit situation, future apparatus (e.g., portable computer 110) may be designed to allow selective powering and selective display use of the apparatus by an IC card, whereupon the second apparatus IC cards could be sold as upgrade options. Within FIG. 6, the short-/long-dashed enclosure 270''' and the short-dashed enclosure 280''' are again representative of powering zones of the first apparatus mode and the second apparatus mode, respectively.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

As non-exhaustive examples, while both a background and example embodiments of the present invention were described using example portable computer and electronic organizer equipment, practice of the present invention is not limited thereto, i.e., practice of the present invention may be had with differing types of improved apparatus. For instance, the low-level-processor arrangement may be used to provide an electronic calculator or a cell phone, instead of an electronic organizer. In addition, neither the high-level-processor nor the low-level-processor is limited to providing only one type of apparatus within the improved apparatus, for example, the low-level-processor may be used (e.g., with multiple programming and supportive arrangements) to provide all three of the electronic organizer, calculator and cell phone within the same equipment.

What is claimed is:

1. An integrated apparatus comprising:
   a high-level-processor; and
   a low-level-processor;
   said integrated apparatus to provide a first apparatus operated with said high-level-processor in a first mode of operation operating high-level application software, and said integrated apparatus to provide a second apparatus operated with said low-level-processor in a second mode of operation operating low-level application software.

2. An integrated apparatus as claimed in claim 1, said low-level-processor to be powered in said second mode of operation to provide said second apparatus, while said high-level-processor remains at least substantially unpowered in said second mode of operation.

3. An integrated apparatus as claimed in claim 1, said integrated apparatus to allow at least one of: powering into said first mode of operation during times exclusive of powering into said second mode of operation, and powering into said second mode of operation during times exclusive of powering into said first mode of operation.

4. An integrated apparatus as claimed in claim 1, said low-level-processor to operate in a first manner in the first apparatus mode, and to operate in a differing manner in the second apparatus mode.

5. An integrated apparatus as claimed in claim 1, said low-level-processor being provided as part of a chipset providing other components of said integrated apparatus.

6. An integrated apparatus as claimed in claim 1, wherein said first apparatus is a portable computer.

7. An integrated apparatus comprising:
   high-level-processor means for providing high-level-processing operating high-level application software as a portable computer; and
   low-level-processor means for providing low-level-processing operating high-level application software as a personal organizer;
   said integrated apparatus to provide a first apparatus operated with said high-level-processor means in a first mode of operation, and said integrated apparatus to provide a second apparatus operated with said low-level-processor means in a second mode of operation.

8. An integrated apparatus as claimed in claim 7, said low-level-processor means to be powered in said second mode of operation to provide said second apparatus, while said high-level-processor means remains at least substantially unpowered in said second mode of operation.

9. An integrated apparatus as claimed in claim 7, said integrated apparatus to allow at least one of: powering into said first mode of operation during times exclusive of powering into said second mode of operation, and powering into said second mode of operation during times exclusive of powering into said first mode of operation.

10. An integrated apparatus as claimed in claim 7, said low-level-processor means for operating in a first manner in the first apparatus mode, and for operating in a differing manner in the second apparatus mode.

11. An integrated apparatus as claimed in claim 7, said low-level-processor means being provided as part of a chipset providing other components of said integrated apparatus.

12. An integrated apparatus as claimed in claim 7, wherein said first apparatus is a portable computer.

13. A method of providing an integrated apparatus comprising:
   providing a high-level-processor adapted to provide high-level-processing of a portable computer; and
   providing a low-level-processor adapted to provide low-level-processing of a personal organizer;

providing a first apparatus by operation of said high-level-processor in a first mode of operation; and providing a second apparatus by operation of said low-level-processor in a second mode of operation.

14. A method as claimed in claim 13, comprising:

powering said low-level-processor in said second mode of operation to provide said second apparatus, while at least substantially non-powering said high-level-processor in said second mode of operation.

15. A method as claimed in claim 13, comprising at least one of: powering into said first mode of operation during times exclusive of powering into said second mode of operation, and powering into said second mode of operation during times exclusive of powering into said first mode of operation.

16. A method as claimed in claim 13, comprising:

operating said low-level-processor in a first manner in the first apparatus mode; and operating said low-level-processor in a differing manner in the second apparatus mode.

17. A method as claimed in claim 13, comprising providing said low-level-processor as part of a chipset providing other components of said integrated apparatus.

18. A method as claimed in claim 13, comprising providing said first apparatus as a portable computer.

19. A portable computer system adapted to be selectable into a differing apparatus, comprising:

a high-level-processor to provide high-level-processing for operation as a portable computer; and a low-level-processor to provide low-level-processing for operation as a personal organizer;

said portable computer system to provide a portable computer apparatus operated with said high-level-processor processing operating high-level application software in a portable computer mode of operation processing, and said portable computer system to provide said differing apparatus operated with said low-level-processor processing operating low-level application software in another mode of operation.

20. A portable computer system as claimed in claim 19, said portable computer system to allow at least one of: powering into said portable computer mode of operation during times exclusive of powering into said another mode of operation, and powering into said another mode of operation during times exclusive of powering into said portable computer mode of operation.

21. An integrated apparatus comprising:

a high-level processor to operate in a first mode of operation to provide a first apparatus processing high-level application software as a portable computer; and a low-level processor to operate in a second mode of operation to provide a second apparatus processing operating low-level application software as a personal organizer.

* * * * *